(12) United States Patent
Kojima

(10) Patent No.: US 11,914,399 B2
(45) Date of Patent: Feb. 27, 2024

(54) OPTICAL FIBER SENSING SYSTEM, OPTICAL FIBER SENSING EQUIPMENT, AND UNMANNED AERIAL VEHICLE ALLOCATION METHOD

(71) Applicant: NEC Corporation, Tokyo (JP)

(72) Inventor: Takashi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 103 days.

(21) Appl. No.: 17/631,718

(22) PCT Filed: Aug. 6, 2019

(86) PCT No.: PCT/JP2019/030952
§ 371 (c)(1),
(2) Date: Jan. 31, 2022

(87) PCT Pub. No.: WO2021/024388
PCT Pub. Date: Feb. 11, 2021

(65) Prior Publication Data
US 2022/0317707 A1 Oct. 6, 2022

(51) Int. Cl.
*G05D 1/10* (2006.01)
*G05D 1/00* (2006.01)
(Continued)

(52) U.S. Cl.
CPC .......... *G05D 1/101* (2013.01); *B64C 39/024* (2013.01); *G01H 9/006* (2013.01); *B64U 2101/30* (2023.01); *B64U 2201/10* (2023.01)

(58) Field of Classification Search
CPC ....... G05D 1/101; B64C 39/024; G01H 9/006
(Continued)

(56) References Cited

U.S. PATENT DOCUMENTS 11,582,578 B2 * 2/2023 Floury ................ H04W 64/003
2004/0046661 A1 * 3/2004 Vaccaro ............. G08B 13/2494
340/557
(Continued)

FOREIGN PATENT DOCUMENTS

CN    107862821 A    3/2018
CN    109323132 A    2/2019
(Continued)

OTHER PUBLICATIONS

International Search Report for PCT Application No. PCT/JP2019/030952, dated Sep. 10, 2019.
(Continued)

*Primary Examiner* — Peter D Nolan
*Assistant Examiner* — Luke Huynh
(74) *Attorney, Agent, or Firm* — Sughrue Mion, PLLC

(57) ABSTRACT

An optical fiber sensing system according to the present disclosure includes an optical fiber (10) that detects vibration, a detection unit (21) that detects occurrence of a predetermined event, based on an optical signal on which vibration detected by the optical fiber (10) is superimposed, an identification unit (22) that identifies an occurrence location of the predetermined event, based on the optical signal, and identifies a movement destination area serving as a moving destination of an unmanned aerial vehicle that monitors an occurrence location of the predetermined event, based on an occurrence location of the predetermined event, and a control unit (23) that controls the unmanned aerial vehicle to move to the movement destination area.

12 Claims, 14 Drawing Sheets

(51) Int. Cl.
*B64C 39/02* (2023.01)
*G01H 9/00* (2006.01)
*B64U 101/30* (2023.01)

(58) Field of Classification Search
USPC ............................................................. 701/3
See application file for complete search history.

(56) References Cited

U.S. PATENT DOCUMENTS

2006/0083458 A1* 4/2006 Iffergan ............... G08B 13/124
                                                    385/13
2017/0092109 A1* 3/2017 Trundle ............... G08B 25/006

FOREIGN PATENT DOCUMENTS

| JP | 2001-304822 A |   | 10/2001 |
|----|---------------|---|---------|
| JP | 2001304822 A  | * | 10/2001 |
| JP | 2015-207149 A |   | 11/2015 |
| JP | 2016-171442 A |   | 9/2016  |
| JP | 2018-041168 A |   | 3/2018  |
| JP | 2018-190199 A |   | 11/2018 |

OTHER PUBLICATIONS

JP Office Action for JP Application No. 2021-538594, dated Mar. 7, 2023 with English Translation.

* cited by examiner

OPTICAL FIBER SENSING SYSTEM, OPTICAL FIBER SENSING EQUIPMENT, AND UNMANNED AERIAL VEHICLE ALLOCATION METHOD

This application is a National Stage Entry of PCT/JP2019/030952 filed on Aug. 6, 2019, the contents of all of which are incorporated herein by reference, in their entirety.

TECHNICAL FIELD

The present disclosure relates to an optical fiber sensing system, optical fiber sensing equipment, and an unmanned aerial vehicle allocation method.

BACKGROUND ART

An optical fiber can be used not only for communication but also for monitoring. For example, Patent Literature 1 discloses a technique of detecting a displacement of a monitoring target portion by using an optical fiber buried in the monitoring target portion such as an inclined ground.

Meanwhile, there is a technique of monitoring a predetermined person by a drone. For example, Patent Literature 2 discloses a technique of photographing a monitored person with a drone, based on position information of an information terminal device carried by the monitored person.

CITATION LIST

Patent Literature

[Patent Literature 1] Japanese Unexamined Patent Application Publication No. 2001-304822
[Patent Literature 2] Japanese Unexamined Patent Application Publication No. 2015-207149

SUMMARY OF INVENTION

Technical Problem

The technique disclosed in Patent Literature 2 is based on a premise that a monitored person being a monitoring target is monitored by a drone in a state in which the monitoring target is identified in advance. However, when monitoring is performed by using an optical fiber, with occurrence of a predetermined event as a trigger, a location where the predetermined event occurs or the like may be identified as a monitoring target in some cases. However, the technique disclosed in Patent Literature 2 has a problem that the monitoring target cannot be properly monitored when a predetermined event occurs.

An object of the present disclosure is to solve the above-mentioned problem and to provide an optical fiber sensing system, optical fiber sensing equipment, and an unmanned vehicle allocation method that are capable of appropriately monitoring a monitoring target when a predetermined event occurs.

Solution to Problem

An optical fiber sensing system according to one aspect includes:
  an optical fiber that detects vibration;
  a detection unit that detects occurrence of a predetermined event, based on an optical signal on which vibration detected by the optical fiber is superimposed;
  an identification unit that identifies an occurrence location of the predetermined event, based on the optical signal, and identifies a movement destination area serving as a movement destination of an unmanned aerial vehicle that monitors an occurrence location of the predetermined event, based on the occurrence location of the predetermined event; and
  a control unit that controls the unmanned aerial vehicle to move to the movement destination area.

Optical fiber sensing equipment according to one aspect includes:
  a detection unit that detects occurrence of a predetermined event, based on an optical signal on which vibration detected by an optical fiber is superimposed;
  an identification unit that identifies an occurrence location of the predetermined event, based on the optical signal, and identifies a movement destination area serving as a movement destination of an unmanned aerial vehicle that monitors an occurrence location of the predetermined event, based on the occurrence location of the predetermined event; and
  a control unit that controls the unmanned aerial vehicle to move to the movement destination area.

An unmanned aerial vehicle allocation method according to one aspect is an unmanned aerial vehicle allocation method using an optical fiber sensing system, and includes:
  a first detection step of detecting vibration by an optical fiber;
  a second detection step of detecting occurrence of a predetermined event, based on an optical signal on which vibration detected by the optical fiber is superimposed;
  an identification step of identifying an occurrence location of the predetermined event, based on the optical signal, and identifying a movement destination area serving as a movement destination of an unmanned aerial vehicle that monitors an occurrence location of the predetermined event, based on the occurrence location of the predetermined event; and
  a control step of controlling the unmanned aerial vehicle to move to the movement destination area.

Advantageous Effects of Invention

According to the above-mentioned aspects, it is possible to acquire an advantageous effect of providing an optical fiber sensing system, optical fiber sensing equipment, and an unmanned aerial vehicle allocation method that are able to appropriately monitor a monitoring target when a predetermined event occurs.

DESCRIPTION OF EMBODIMENTS

Figure 1:
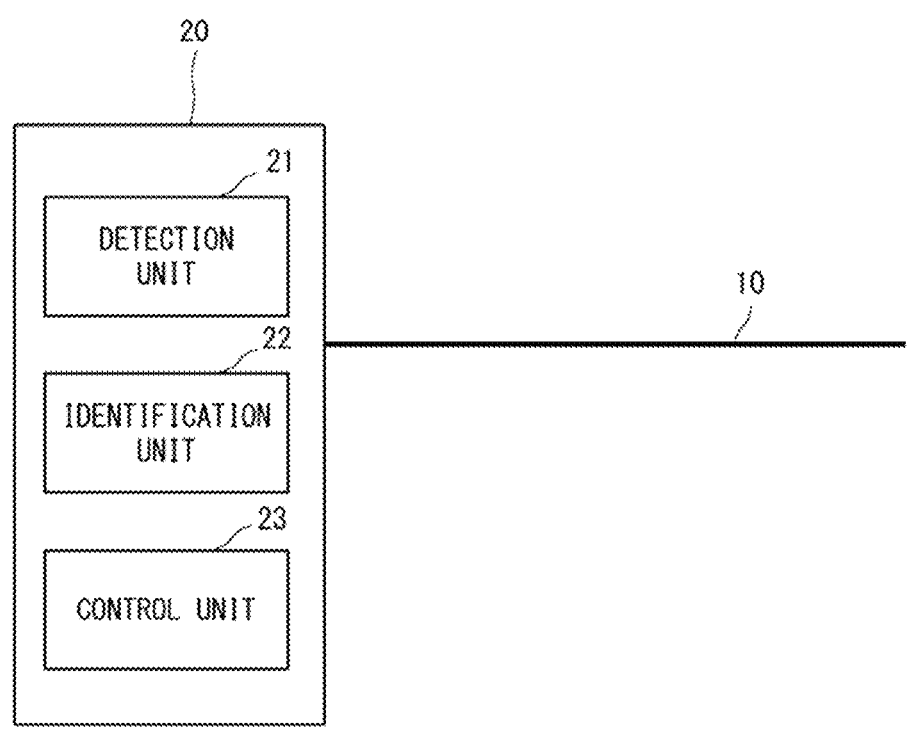
FIG. 1 is a diagram illustrating a configuration example of an optical fiber sensing system according to a first example embodiment.

Example embodiments of the present disclosure will be described below with reference to the drawings. Note that the following description and the drawings are appropriately omitted and simplified for clarity of description. In each of the following drawings, the same elements are denoted by the same reference numerals, and a repetitive description thereof is omitted as necessary.

First Example Embodiment

First, a configuration example of an optical fiber sensing system according to a first example embodiment will be described with reference to FIG. 1.

As illustrated in FIG. 1, the optical fiber sensing system according to the first example embodiment includes an optical fiber 10 and optical fiber sensing equipment 20. The optical fiber sensing equipment 20 includes a detection unit 21, an identification unit 22, and a control unit 23.

The optical fiber 10 is laid in a monitoring area, and one end thereof is connected to the optical fiber sensing equipment 20. The monitoring area may be considered to be, for example, a border, a facility, a theme park, a prison, an airport, these peripheries, and the like, but not limited thereto. The optical fiber 10 may be entirely laid in the ground, may be entirely laid on the ground, may be partially laid in the ground, and may be otherwise laid on the ground.

When some event occurs in the monitoring area, vibration associated to the event is generated. This vibration is superimposed on return light (an optical signal) transmitted by the optical fiber 10, which will be described later. Therefore, the optical fiber 10 can detect vibration generated in or near the monitoring area.

The detection unit 21 receives the return light on which the vibration detected by the optical fiber 10 is superimposed from the optical fiber 10. For example, the detection unit 21 enters pulsed light into the optical fiber 10, and receives reflected light and scattered light generated when the pulsed light is transmitted through the optical fiber 10, as the return light via the optical fiber 10.

Herein, as described above, the vibration superimposed on the return light is the vibration generated according to the event occurring in the monitoring area. Therefore, the detection unit 21 can detect the occurrence of a predetermined event, based on the return light. The predetermined event is, for example, suspicious behavior of a person or the like.

The identification unit 22 identifies an occurrence location of the predetermined event, based on the return light received by the detection unit 21. For example, the identification unit 22 identifies a position (distance from the optical fiber sensing equipment 20) on the optical fiber 10 at which the vibration is detected, based on a time difference between a time at which the pulse light is incident on the optical fiber 10 by the detection unit 21 and a time at which the return light on which the vibration generated according to the predetermined event is superimposed is received by the detection unit 21 from the optical fiber 10, and identifies the occurrence location of the predetermined event, based on the identified position on the optical fiber 10. For example, the identification unit 22 identifies the above-identified position on the optical fiber 10 as the occurrence location of the predetermined event.

Further, the identification unit 22 identifies a movement destination area serving as a movement destination of an unmanned aerial vehicle that monitors an occurrence location of the predetermined event, based on the occurrence location of the predetermined event identified above. For example, the identification unit 22 identifies, as the movement destination area of the unmanned aerial vehicle, an area in which the occurrence location of the predetermined event can be photographed by the unmanned aerial vehicle.

The unmanned aerial vehicle is an unmanned aircraft equipped with a camera and capable of autonomous flight, and is, for example, a drone, a stealth aircraft, or the like. The drone is capable of photographing a part of a certain area in detail, and the stealth aircraft is capable of photographing the whole of a certain area in an exhaustive manner. In addition, the unmanned aerial vehicle can acquire position information of the self-vehicle. For example, the unmanned aerial vehicle can calculate position information of the self-vehicle, based on a GPS signal from a global positioning system (GPS) satellite.

The control unit 23 wirelessly transmits various instructions to the unmanned aerial vehicle and controls the unmanned aerial vehicle.

For example, after specifying position information of the movement destination area identified by the identification unit 22, the control unit 23 controls the unmanned aerial vehicle to move to the movement destination area. Under this control, the unmanned aerial vehicle moves to the movement destination area by autonomous flight, based on the position information of the movement destination area specified by the control unit 23 and the position information of the self-vehicle acquired by the self-vehicle.

Next, an example of an overall operation flow of the optical fiber sensing system according to the first example embodiment will be described with reference to FIG. 2.

Figure 2:
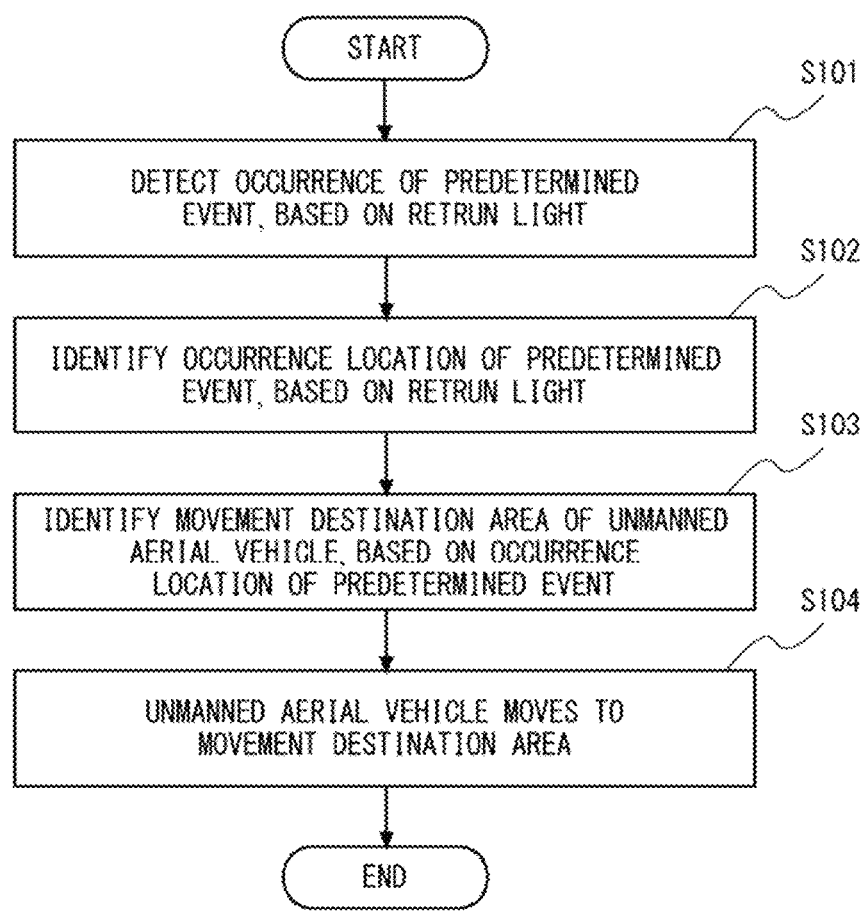
FIG. 2 is a flow chart illustrating an example of an overall operation flow of the optical fiber sensing system according to the first example embodiment.

As illustrated in FIG. 2, the detection unit 21 receives the return light on which the vibration detected by the optical fiber 10 is superimposed from the optical fiber 10, and detects occurrence of a predetermined event, based on the received return light (step S101).

Subsequently, the identification unit 22 identifies a location where a predetermined event occurs, based on the return light received by the detection unit 21 (step S102), and further, based on the occurrence location of the predetermined event, identifies a movement destination area of the unmanned aerial vehicle that monitors an occurrence location of the predetermined event (step S103).

Thereafter, the control unit 23 controls the unmanned aerial vehicle to move to the movement destination area identified by the identification unit 22 (step S104).

As described above, according to the first example embodiment, the detection unit 21 detects the occurrence of the predetermined event, based on the return light on which vibration detected by the optical fiber 10 is superimposed. The identification unit 22 identifies an occurrence location of the predetermined event, based on the return light, and, based on the occurrence location of the predetermined event, identifies the movement destination area of the unmanned aerial vehicle that monitors an occurrence location of the predetermined event. The control unit 23 controls the unmanned aerial vehicle to move to the movement destination area. Therefore, when a predetermined event occurs, it is possible to appropriately monitor an occurrence location of the predetermined event to be monitored by the unmanned vehicle.

Second Example Embodiment

A second example embodiment is further materialization of the first example embodiment described above, and an example in which a monitoring area is a fence F installed on a border, a facility, or the like, more specifically, on an outer periphery of the border, the facility, or the like, and the periphery of the fence F. The second example embodiment is an example in which the unmanned aerial vehicle is a drone D.

Hereinafter, a configuration example of an optical fiber sensing system according to the second example embodiment will be described with reference to FIGS. 3 and 4.

Figure 3:
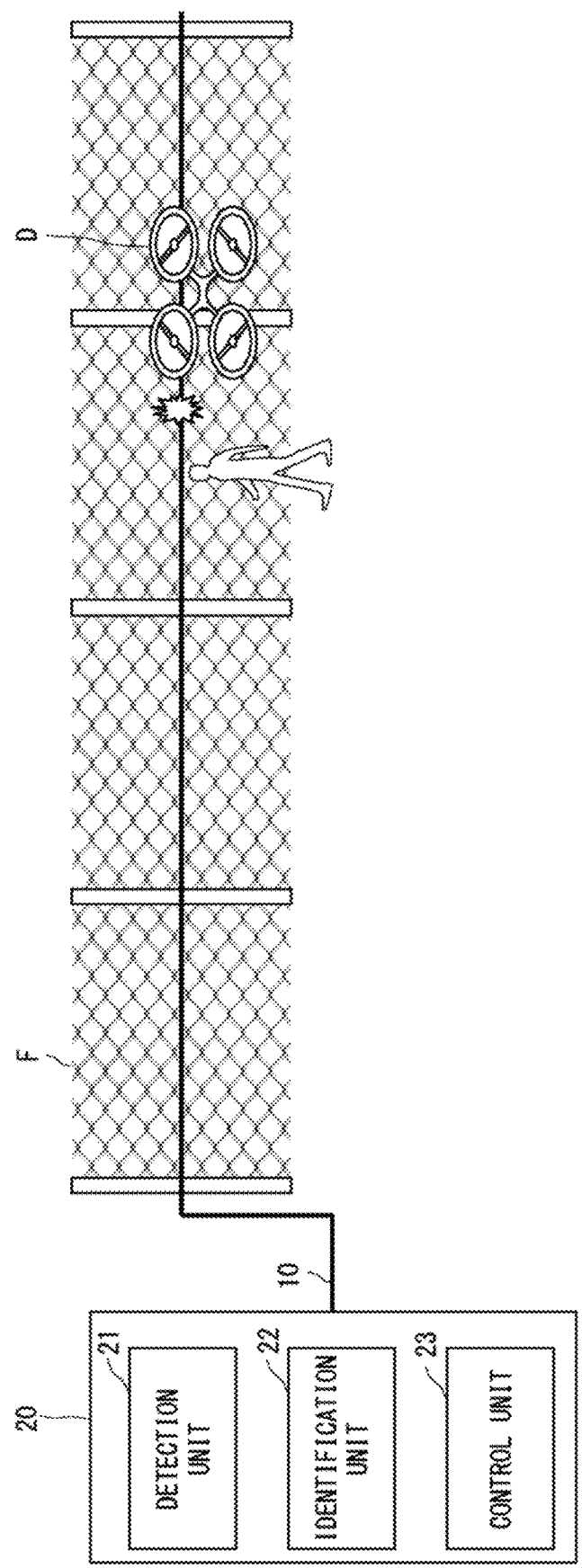
FIG. 3 is a diagram illustrating a configuration example of an optical fiber sensing system according to a second example embodiment.
Figure 4:
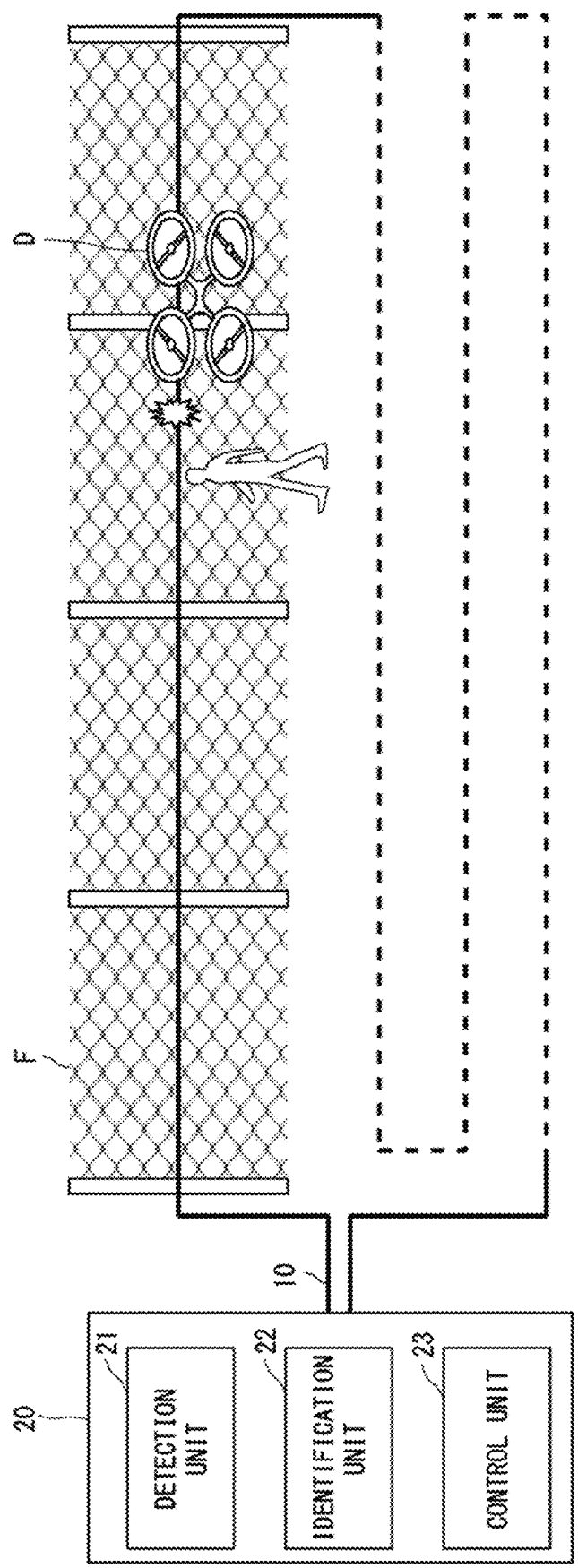
FIG. 4 is a diagram illustrating a configuration example of the optical fiber sensing system according to the second example embodiment.

As illustrated in FIGS. 3 and 4, the optical fiber sensing system according to the second example embodiment includes an optical fiber 10 and optical fiber sensing equipment 20, similarly to the first example embodiment described above. The optical fiber sensing equipment 20 includes a detection unit 21, an identification unit 22, and a control unit 23, similarly to the first example embodiment described above.

The fence F is installed along a border line such as an outer periphery of a border, a facility, or the like.

In the example of FIG. 3, the optical fiber 10 is laid in the fence F on the ground, and one end thereof is connected to the optical fiber sensing equipment 20.

In the example of FIG. 4, both ends of the optical fiber 10 are connected to the optical fiber sensing equipment 20, a part of the optical fiber 10 is laid in the fence F on the ground, and the remaining part is laid in the ground around the fence F.

However, a method of laying the optical fiber 10 illustrated in FIGS. 3 and 4 is only an example, and is not limited thereto. For example, all of the optical fibers 10 may be laid in the ground around the fence F.

The detection unit 21 receives return light on which vibration detected by the optical fiber 10 is superimposed from the optical fiber 10, and detects occurrence of a predetermined event in the fence F and its periphery, based on the received return light. The predetermined event is, for example, suspicious behavior of a person occurring in the fence F and its periphery. Specifically, for example, the following can be considered as a predetermined event.

(A) A person grasps and shakes the fence F.
(B) A person hits the fence F.
(C) A person climbs the fence F.
(D) A person climbs the fence F with a ladder.
(E) A person wanders around the fence F.
(F) A person digs the periphery of the fence F.

Herein, the vibration superimposed on the return light is a vibration generated according to the event occurring in the fence F and its periphery. Therefore, the return light has an inherent vibration pattern in which intensity of vibration, a vibration position, a transition of fluctuation of a vibration frequency, and the like are different according to the event occurring in the fence F and its periphery. Therefore, by analyzing a dynamic change in a vibration pattern of the return light, it is possible to identify the event that has caused the vibration. Therefore, the detection unit 21 detects the occurrence of the predetermined event, based on the vibration pattern of the return light.

At this time, the detection unit 21 may detect the occurrence of the predetermined event by using pattern matching. For example, a vibration pattern when a predetermined event occurs for each predetermined event to be detected is stored in advance in a storage unit, which is not illustrated, as a matching pattern. The detection unit 21 compares the vibration pattern of the return light with the matching pattern. When there is a matching pattern in which a matching ratio with the vibration pattern of the return light is equal to or more than a threshold value in the matching pattern, the detection unit 21 determines that a predetermined event associated to the matching pattern has occurred.

The identification unit 22 identifies the occurrence location of the predetermined event, based on the return light received by the detection unit 21. For example, the identification unit 22 identifies a position (distance from the optical fiber sensing equipment 20) on the optical fiber 10 at which vibration of a vibration pattern associated to the predetermined event is detected, based on a time difference between s time at which pulse light is incident on the optical fiber 10 by the detection unit 21 and a time at which the returning light on which the vibration is superimposed is received by the detection unit 21 from the optical fiber 10, and identifies an occurrence location of the predetermined event, based on the identified position on the optical fiber 10. For example, the identification unit 22 identifies the above-identified position on the optical fiber 10 as an occurrence location of the predetermined event.

Further, the identification unit 22 identifies a movement destination area serving as a movement destination of the drone D that monitors an occurrence location of the predetermined event, based on the occurrence location of the predetermined event identified above. For example, the identification unit 22 may identify an area where an occurrence location of the predetermined event can be photographed by the drone D as a movement destination area of the drone D. In addition, when it is determined that the occurrence location of the predetermined event is included in a preset important area, based on map information stored in the storage unit that is not illustrated, or when it is determined that the important area exists in the vicinity of the occurrence location of the predetermined event, the identification unit 22 may use, as the movement destination area of the drone D, an area where the occurrence location of the predetermined event and the important area can be photographed by the drone D.

Figure 5:
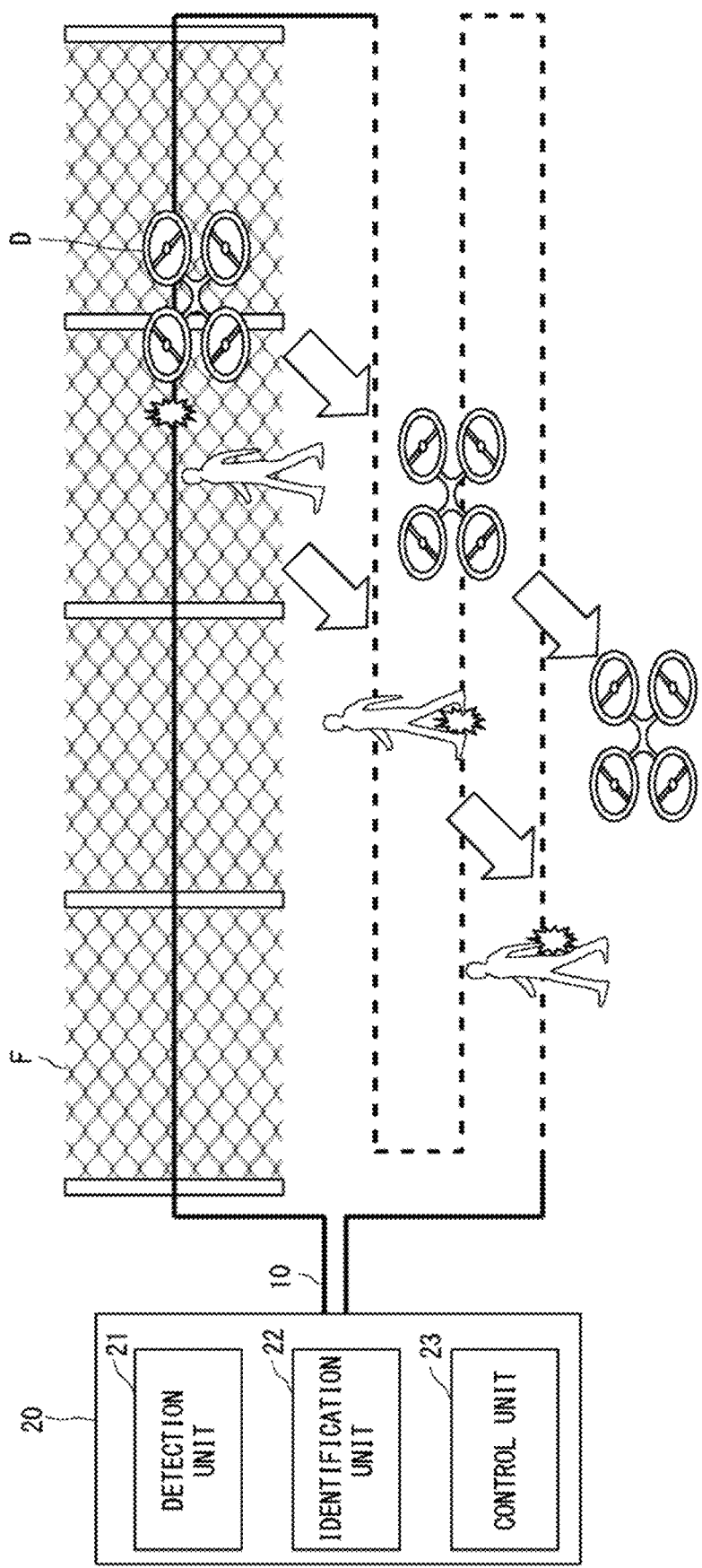
FIG. 5 is a diagram illustrating an example in which a position of an occurrence location of a predetermined event changes.

When the predetermined event is, for example, the event "a person wanders around the fence F" in (E) that is described above, the person moves as illustrated in FIG. 5 even after the event (E) is detected. As a result, the position of the occurrence location of the predetermined event also changes. Therefore, when the position of the occurrence location of the predetermined event changes, the identification unit 22 may identify the movement destination area of the drone D in such a way as to follow the change in the position.

The drone D is an unmanned aircraft equipped with a camera and capable of autonomous flight. In addition, the drone D can perform photographing with a camera and wirelessly transmit the photographed video to the control unit 23. In addition, the drone D can acquire position information of the self-vehicle. For example, the drone D can calculate the position information of the self-vehicle, based on a GPS signal from a GPS satellite. The drone D can also send out an alert. For example, the drone D can be equipped with a speaker and send out an alarm sound from the speaker. In addition, the drone D can wirelessly receive various instructions from the control unit 23, and performs movement, sending of an alert, photographing, wireless transmission of photographed video, and the like in accordance with the various instructions from the control unit 23.

The drone D stands by in a drone pot while waiting for various instructions from the control unit 23. Drone pots may be allocated in a large number in the vicinity of an area where an occurrence frequency of the predetermined event is high, and may be allocated in a small number in the vicinity of an area where the occurrence frequency of the predetermined event is low.

The drone D is equipped with a battery and is driven by the battery. The drone D may be equipped with a solar panel, and the battery of the drone D may be charged with electric power generated by the solar panel. The battery of the drone D may be charged by a charger built in or connected to the drone pot.

In addition, a base station may be installed in the fence F and its periphery, or a spot of wireless fidelity (Wifi, registered trademark) may be installed in such a way as to enable wireless communication between the drone D and the control unit 23.

The control unit 23 wirelessly transmits various instructions to the drone D and controls the drone D.

For example, when the detection unit 21 detects the occurrence of the predetermined event, the control unit 23 controls the drone D to move to the movement destination area after specifying the position information of the movement destination area identified by the identification unit 22. Under this control, the drone D moves to the movement destination area by autonomous flight, based on the position information of the movement destination area specified by the control unit 23 and the position information of the self-vehicle acquired by the self-vehicle.

When the drone D arrives at the movement destination area, the control unit 23 first controls the drone D to send out an alert. Under this control, the drone D sends out an alert. Subsequently, the control unit 23 controls the drone D to photograph the occurrence location of the predetermined event. Under this control, the drone D photographs the occurrence location of the predetermined event by the camera, and wirelessly transmits the photographed image to the control unit 23. Note that when a person is found in a photographed image during the photographing with the drone D, the control unit 23 may control the drone D to zoom up the person. Under this control, the drone D zooms up the person.

Next, with reference to FIG. 6, an example of an overall operation flow of the optical fiber sensing system according to the second example embodiment will be described.

Figure 6:
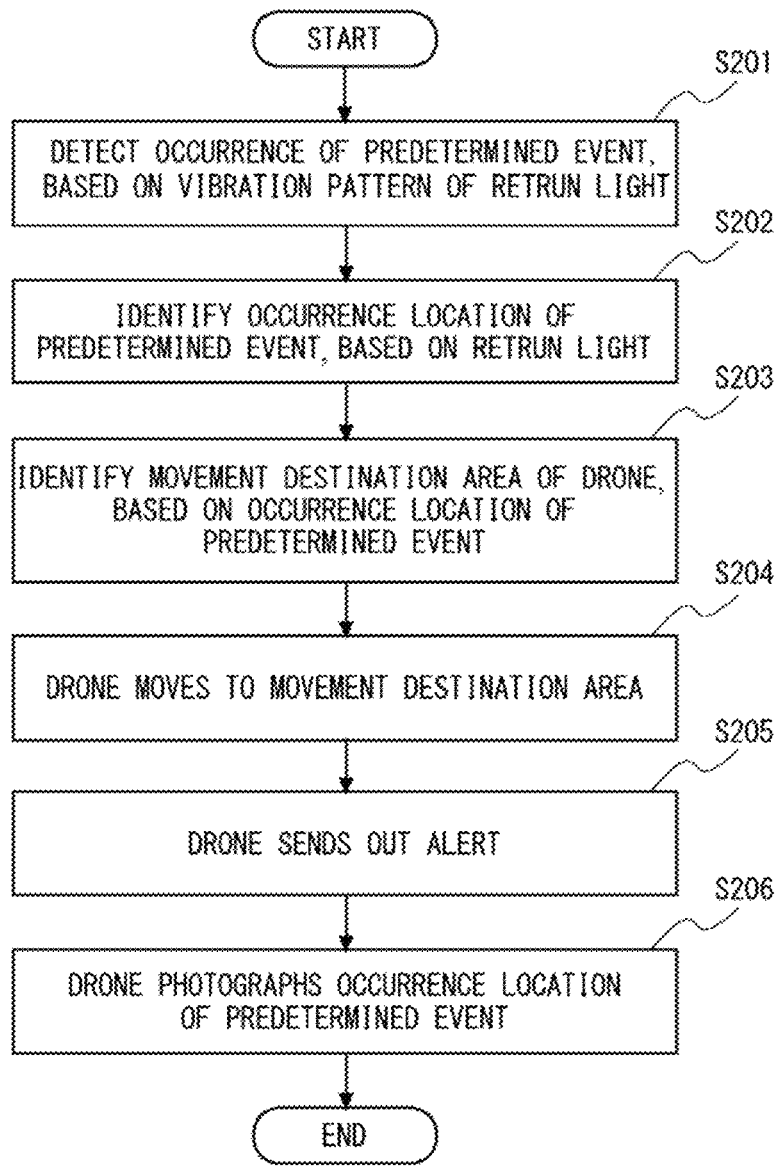
FIG. 6 is a flow chart illustrating an example of an overall operation flow of the optical fiber sensing system according to the second example embodiment.

As illustrated in FIG. 6, the detection unit 21 receives return light on which vibration detected by the optical fiber 10 is superimposed from the optical fiber 10, and detects occurrence of a predetermined event, based on a vibration pattern of the received return light (step S201).

Subsequently, the identification unit 22 identifies an occurrence location of a predetermined event, based on the return light received by the detection unit 21 (step S202), and further identifies a movement destination area of the drone D that monitors the occurrence location of the predetermined event, based on the occurrence location of the predetermined event (step S203).

The control unit 23 controls the drone D to move to the movement destination area identified by the identification unit 22 (step S204). Further, when the drone D arrives at the movement destination area, the control unit 23 first controls the drone D to send out an alert (step S205), and then controls the drone D to photograph the occurrence location of the predetermined event (step S206).

When a position of the occurrence location of the predetermined event identified in the step S202 changes after the step S206, the identification unit 22 may sequentially identify the movement destination area of the drone D in such a way as to follow the positional change of the occurrence location of the predetermined event, and the control unit 23 may move the drone D to the movement destination area sequentially identified by the identification unit 22.

Further, in the step S206, when a person is found in a photographed image as a result of photographing the occurrence location of the predetermined event with the drone D, the identification unit 22 may change a monitoring target from the occurrence location of the predetermined event to the person found and may sequentially identify the movement destination area of the drone D in such a way as to follow the position change of the person, and the control unit 23 may move the drone D to the movement destination area sequentially identified by the identification unit 22 after the step S206.

As described above, according to the second example embodiment, the detection unit 21 detects the occurrence of the predetermined event, based on the vibration pattern of the return light on which the vibration detected by the optical fiber 10 is superimposed. The identification unit 22 identifies the occurrence location of the predetermined event, based on the return light, and identifies the movement destination area of the drone D that monitors the occurrence location of the predetermined event, based on the occurrence location of the predetermined event. The control unit 23 moves to the movement destination area, sends out an alert, and controls the drone D to photograph the occurrence location of the predetermined event. Therefore, when a predetermined event occurs, the drone D can appropriately monitor an occurrence location of the predetermined event to be monitored.

Third Example Embodiment

The second example embodiment described above has been based on the assumption that an occurrence location of a predetermined event is monitored by the drone D. However, a location where a predetermined event occurs can be monitored not only by the drone D, but also by a person such as a security guard (hereinafter referred to as a security guard) or a camera installed in a monitoring area. Further, when a security guard is positioned closer to the occurrence location of the predetermined event than the drone D, or when a camera capable of photographing the occurrence location of the predetermined event is installed, it is considered that the security guard or the camera can start monitoring earlier than the drone D.

Therefore, in the third example embodiment, an identification unit 22 first determines a monitoring means for monitoring an occurrence location of a predetermined event from among the drone D, the camera, and the security guard, based on the occurrence location of the predetermined event, and identifies a movement destination area of the drone D when the drone D is determined as the monitoring means.

Hereinafter, a configuration example of an optical fiber sensing system according to the third example embodiment will be described with reference to FIG. 7.

Figure 7:
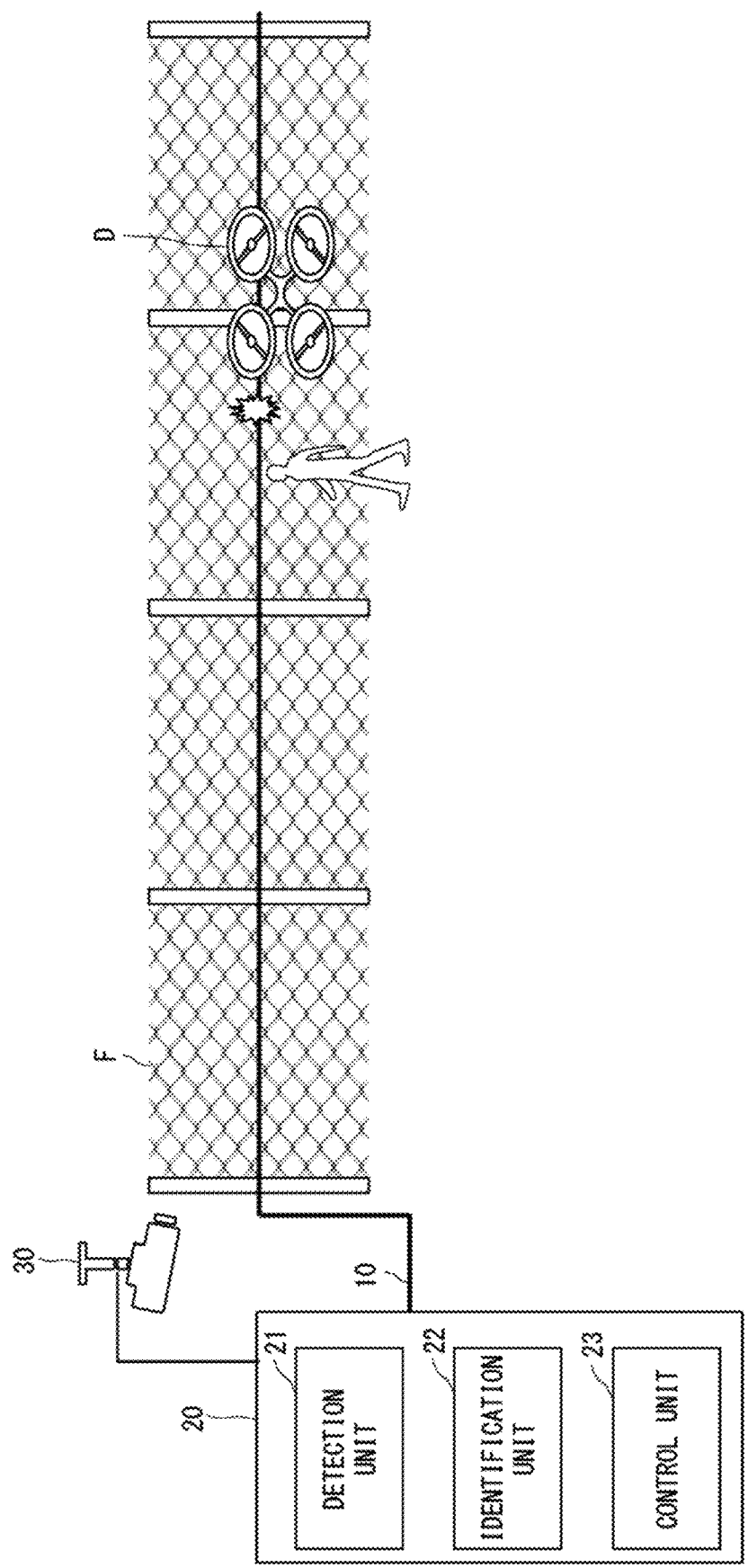
FIG. 7 is a diagram illustrating a configuration example of an optical fiber sensing system according to a third example embodiment.

As illustrated in FIG. 7, the optical fiber sensing system according to the third example embodiment differs from that of FIG. 3 in the second example embodiment described above in that a camera 30 is added. Although only one camera 30 is provided in FIG. 7, a plurality of cameras 30 may be provided.

The camera 30 is a camera capable of photographing at least a part of the fence F and a monitoring area around the fence F, and is achieved by, for example, a fixed camera, a pan tilt zoom (PTZ) camera, or the like. The control unit 23 can control an angle (azimuth angle, elevation angle) of the camera 30, zoom magnification, and the like.

The identification unit 22 holds camera information indicating an installation position of the camera 30 (a distance from optical fiber sensing equipment 20), a photographable area, and the like. Note that when a plurality of cameras 30 are provided, the identification unit 22 holds camera information for each of the plurality of cameras 30.

The identification unit 22 acquires position information of the drone D periodically or irregularly. For example, the drone D is configured to periodically wirelessly transmit the position information to the identification unit 22, or to wirelessly transmit the position information to the identification unit 22 in response to a request from the identification unit 22. Note that when a plurality of drones D are deployed, the identification unit 22 acquires position information for each of the plurality of drones D periodically or irregularly.

The identification unit 22 acquires position information of the security guard periodically or irregularly. For example, a terminal carried by the security guard periodically wirelessly transmits the position information to the identification unit 22, or wirelessly transmits the position information to the identification unit 22 in response to a request from the identification unit 22. Note that when a plurality of security guards are deployed, the identification unit 22 acquires position information for each of the plurality of security guards periodically or irregularly.

The identification unit 22 determines a monitoring means for monitoring the occurrence location of a predetermined event from among the drone D, the camera 30, and the security guard, based on the occurrence location of the predetermined event, the position information of the drone D, the camera information of the camera 30, the position information of the security guard, and the like.

Herein, an example of a method of determining a monitoring means for monitoring the occurrence location of a predetermined event with respect to the identification unit 22 will be described. Note that the method to be described below is performed after the identification unit 22 identifies the occurrence location of the predetermined event.

(A1) Method A1

First, a method A1 will be described with reference to FIG. 8.

Figure 8:
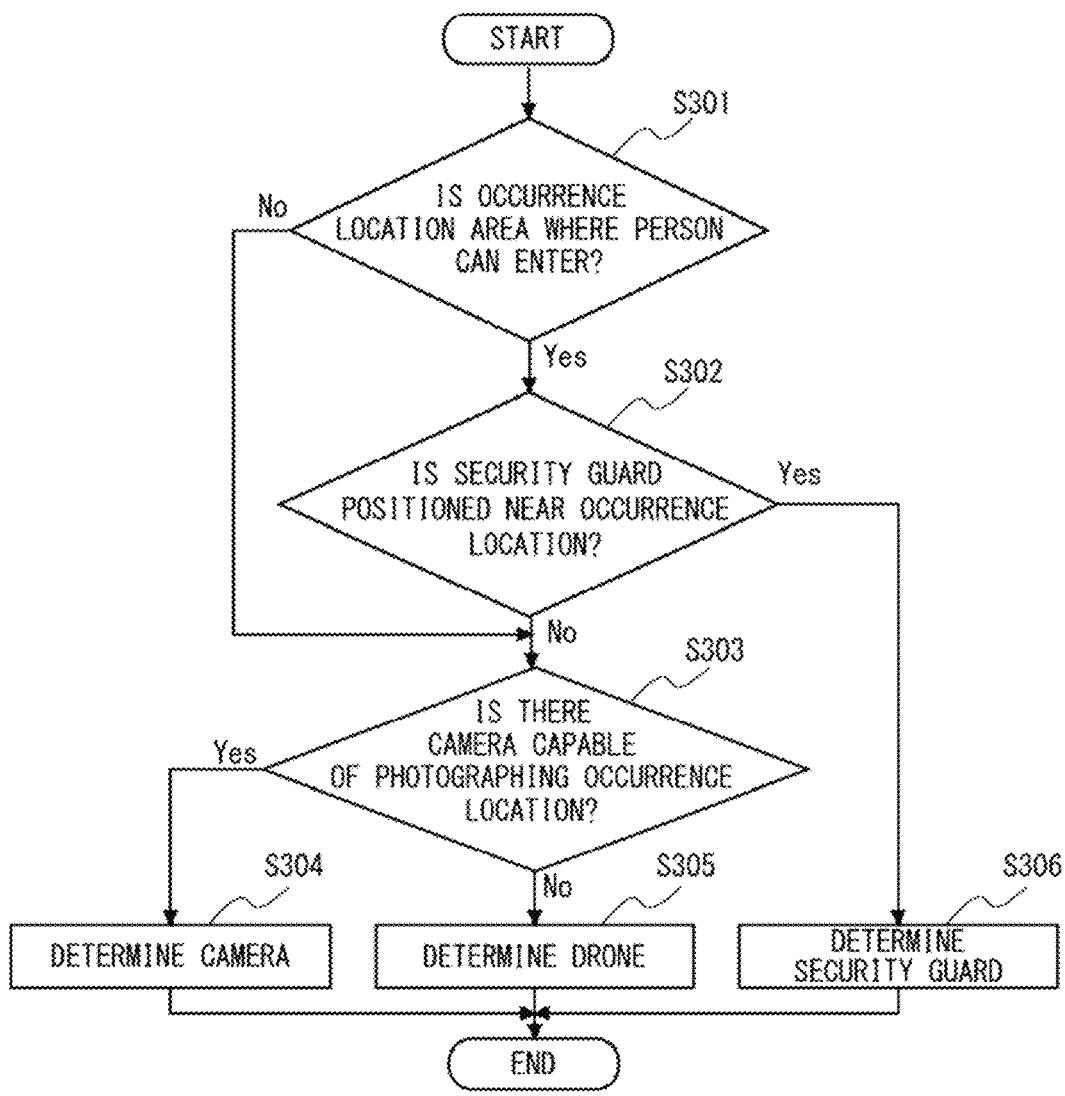
FIG. 8 is a flow chart illustrating an example of a method in which an identification unit according to the third example embodiment determines a monitoring means for monitoring an occurrence location of a predetermined event.

As illustrated in FIG. 8, first, the identification unit 22 determines whether a location a predetermined event occurs is an area (for example, an area other than a river, a lake, or the like) in which a person can enter, based on map information stored in a storage unit which is not illustrated (step S301).

When the occurrence location of the predetermined event is an area in which a person can enter (Yes in step S301), then the identification unit 22 determines whether a security guard is positioned near the occurrence location of the predetermined event, based on the position information of the security guard (step S302). For example, when a security guard is positioned within a predetermined distance from the occurrence location of the predetermined event, the result of the step S302 is Yes. When the security guard is positioned near the occurrence location of the predetermined event (Yes in step S302), the identification unit 22 determines the security guard as the monitoring means (step S306).

On the other hand, when the occurrence location of the predetermined event is not an area in which a person can enter (No in step S301) or when the security guard is not positioned near the occurrence location of the predetermined event (No in step S302), the identification unit 22 then determines whether there is a camera 30 capable of photographing the occurrence location of the predetermined event, based on the camera information of the camera 30 (step S303). When there is a camera 30 capable of photographing the occurrence location of the predetermined event (Yes in step S303), the identification unit 22 determines the camera 30 as a monitoring unit (step S304). On the other hand, when there is no camera 30 capable of photographing the occurrence location of the predetermined event (No in step S303), the identification unit 22 determines the drone D as the monitoring means (step S305).

(A2) Method A2

Next, a method A2 will be described with reference to FIG. 9.

Figure 9:
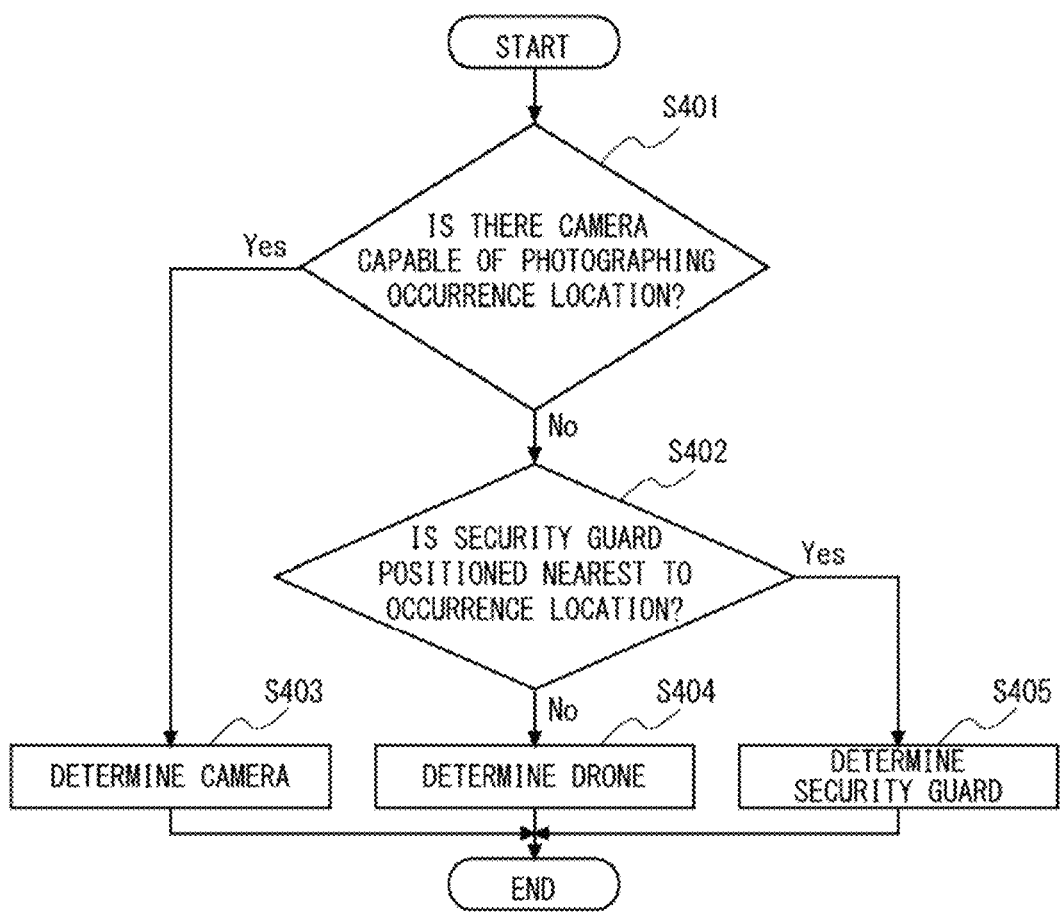
FIG. 9 is a flow chart illustrating an example of a method in which the identification unit according to the third example embodiment determines a monitoring means for monitoring an occurrence location of a predetermined event.

As illustrated in FIG. 9, first, the identification unit 22 determines whether there is a camera 30 capable of photographing a location where a predetermined event occurs, based on the camera information of the camera 30 (step S401). When there is a camera 30 capable of photographing the occurrence location of the predetermined event (Yes in step S401), the identification unit 22 determines the camera 30 as a monitoring means (step S403).

On the other hand, when there is no camera 30 capable of photographing the occurrence location of the predetermined event (No in step S401), then, the identification unit 22 determines whether a security guard is positioned closest to the occurrence location of the predetermined event among the drone D and the security guard, based on the position information of the drone D and the position information of the security guard (step S402). When the security guard is positioned nearest (Yes in step S402), the identification unit 22 determines the security guard as the monitoring means (step S405). On the other hand, when the drone D is positioned nearest (No in step S402), the identification unit 22 determines the drone D as the monitoring means (step S405).

However, the method of determining a monitoring means is not limited to the methods A 1 and A 2 described above.

For example, when the predetermined event is, for example, the event "a person wanders around the fence F" in the above-mentioned (E), the position of the occurrence location of the above-mentioned (E) event changes. In this case, the identification unit 22 may determine the monitoring means, based on the position change rate at which the position of the occurrence location of the predetermined event changes. For example, in a case where the position change rate is low, when there is a camera 30 capable of photographing an occurrence location of the predetermined event, the identification unit 22 determines the camera 30 as the monitoring means. On the other hand, in a case where the position change rate is high, when a security guard is positioned near the occurrence location of the predetermined event, the identification unit 22 determines the security guard as the monitoring means, and when the security guard is not positioned near, the identification unit 22 determines the drone D as the monitoring means.

In the third example embodiment, it is possible to monitor the occurrence location of the predetermined event by the camera 30. Therefore, a lot of drone pots where the drone D stands by may be allocated in the vicinity of an area where the number of cameras 30 is small.

Next, with reference to FIG. 10, an example of an overall operation flow of the optical fiber sensing system according to the third example embodiment will be described.

Figure 10:
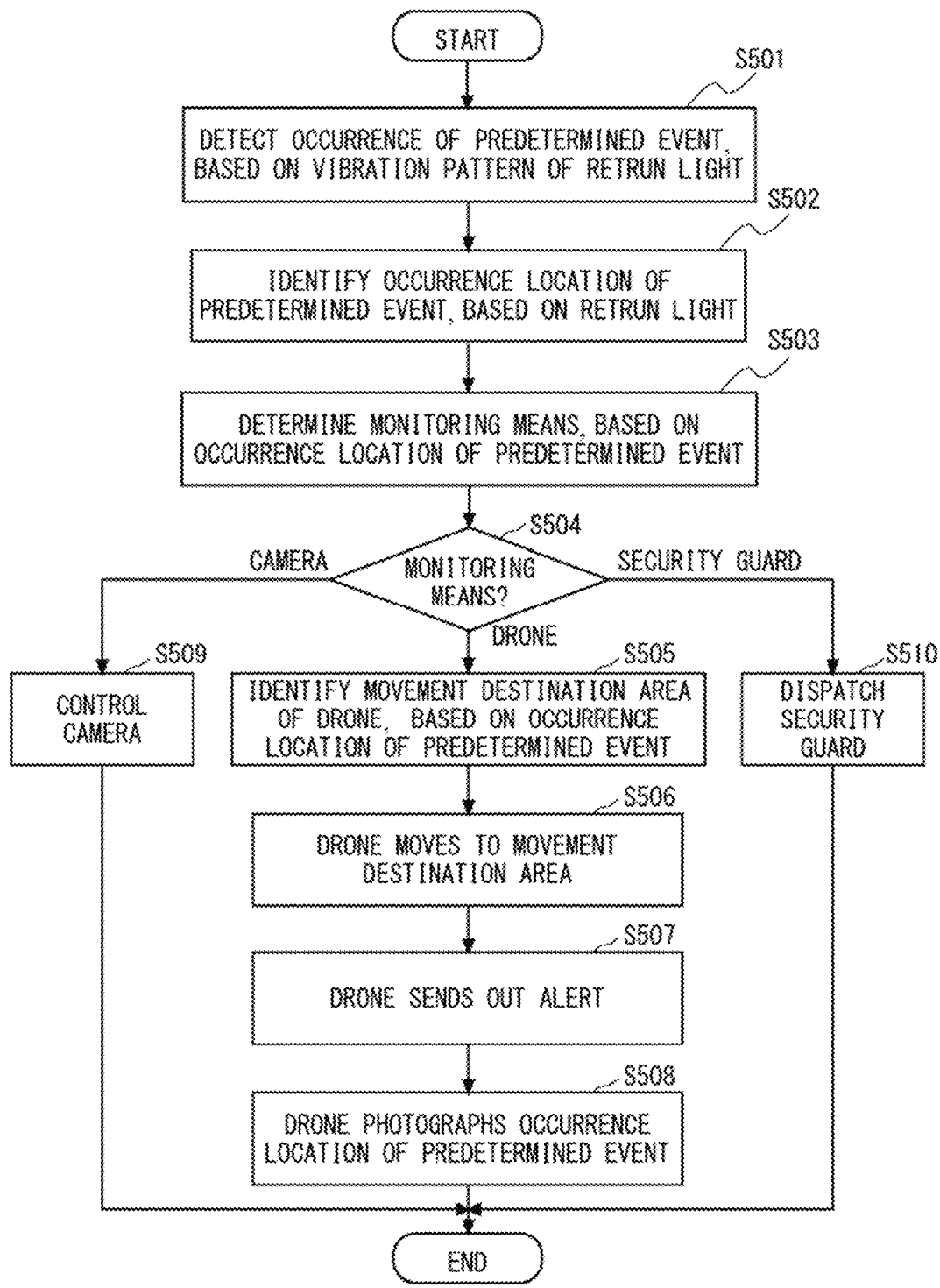
FIG. 10 is a flow chart illustrating an example of an overall operation flow of the optical fiber sensing system according to the third example embodiment.

As illustrated in FIG. 10, first, steps S501 to S502 similar to the steps S201 to S202 in FIG. 6 are performed.

Next, the identification unit 22 determines a monitoring means for monitoring an occurrence location of the predetermined event from among the drone D, the camera 30, and the security guard, based on the occurrence location of the predetermined event (step S503). This determination may be performed by using, for example, the above-described method A1, A2, or the like.

Next, in step S504, the monitoring means determined in the step S503 is determined.

When the monitoring means determined in the step S503 is the drone D, steps S505 to S508 similar to the steps S203 to S206 in FIG. 6 are performed thereafter.

When the monitoring means determined in the step S503 is the camera 30, the control unit 23 controls the angle (azimuth angle, elevation angle) of the camera 30, zoom magnification, and the like, and monitors the occurrence location of the predetermined event thereafter (step S509).

When the monitoring means determined in the step S503 is the security guard, the control unit 23 specifies position information of the occurrence location of the predetermined event, and then wirelessly transmits, to the terminal carried by the security guard, an instruction to the effect that the security guard is directed to the occurrence location of the predetermined event (step S510).

In step S509, when a person is found in a photographed image as a result of photographing the occurrence location of the predetermined event by the camera 30, the identification unit 22 may change the monitoring target from the occurrence location of the predetermined event to the person found, determine the drone D as the monitoring means, and sequentially identify the movement destination area of the drone D in such a way as to follow the positional change of the person, and the control unit 23 may move the drone D to the movement destination area sequentially identified by the identification unit 22.

As described above, according to the third example embodiment, the identification unit 22 determines the monitoring means for monitoring the occurrence location of the predetermined event from among the drone D, the camera 30, and the security guard, based on the occurrence location of the predetermined event. Therefore, for example, when the security guard is positioned closer to the occurrence location of the predetermined event than the drone D, or when a camera capable of photographing the occurrence location of the predetermined event is installed, it is possible for the camera 30 or the security guard to perform monitoring. Therefore, when a predetermined event occurs, it is possible to more quickly monitor the occurrence location of the predetermined event to be monitored.

Fourth Example Embodiment

In the third example embodiment described above, the identification unit 22 determines a monitoring means for monitoring an occurrence location of a predetermined event from among the drone D, the camera 30, and the security guard, and identifies a movement destination area of the drone D when the drone D is determined as the monitoring means.

At this time, depending on a degree of urgency or the like, it may be preferable that the number of drones D used as the monitoring means is plural. In order to appropriately monitor the occurrence location of the predetermined event, it is preferable to dispatch the drone D positioned near the movement destination area and perform monitoring.

Therefore, in the fourth example embodiment, when a drone D is determined as the monitoring means, the identification unit 22 determines the number of the drones D used as the monitoring means, and selects the drone D used as the monitoring means.

Note that a configuration itself of the fourth example embodiment is the same as that of the third example embodiment described above.

First, an example of a method of determining the number of drones D used as the monitoring means with respect to the identification unit 22 will be described.

For example, the identification unit 22 may identify a degree of urgency, based on a vibration pattern of return light received by the detection unit 21, and determine the number of drones D used as the monitoring means, based on the identified degree of urgency. For example, the identification unit 22 may determine the number of people present at an occurrence location of a predetermined event, based on the vibration pattern of the return light, and may increase the degree of urgency as the number of people increases, and may increase the number of drones D as the degree of urgency increases.

Further, the identification unit 22 may set the degree of urgency in advance for each predetermined event to be detected, determine the degree of urgency according to a type of the predetermined event detected by the detection unit 21, and increase the number of drones D as the degree of urgency increases.

Further, the identification unit 22 may determine an occurrence frequency of a predetermined event at the occurrence location of the predetermined event, and may increase the number of drones D as the occurrence frequency increases.

Next, an example of a method of selecting the drone D used as the monitoring means with respect to the identification unit 22 will be described.

For example, the identification unit 22 may select, as the monitoring unit, the number of drones D determined above in order near from the movement destination area, based on position information of the drones D.

Further, the identification unit 22 may identify the drone D positioned within a predetermined distance from the movement destination area, based on the position information of the drone D, and select the drones D of the number determined above from among identified drones D as the monitoring means.

Further, when the number of drones D used as the monitoring means is determined to be plural, the identification unit 22 may select the drones D of the number determined above as the monitoring means in such a way that at least one of the drones D positioned on both sides of the movement destination area is selected, based on the position information of the drones D.

Next, with reference to FIG. 11, an example of an overall operation flow of an optical fiber sensing system according to the fourth example embodiment will be described.

Figure 11:
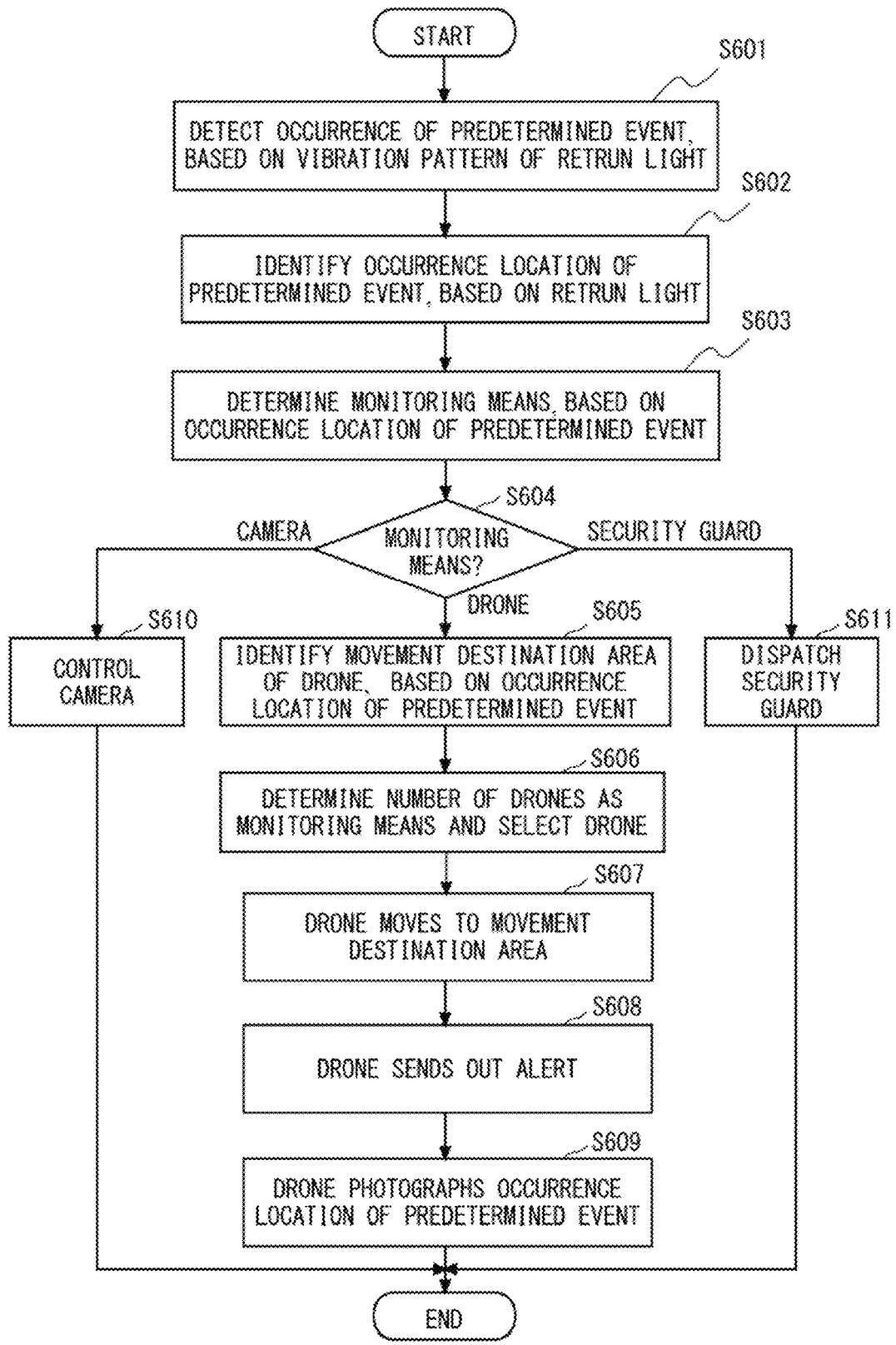
FIG. 11 is a flow chart illustrating an example of an overall operation flow of an optical fiber sensing system according to a fourth example embodiment.

As illustrated in FIG. 11, first, steps S601 to S604 similar to the steps S501 to S504 in FIG. 10 are performed.

When a monitoring means determined in the step S603 is the drone D, first, step S605 similar to the step S505 in FIG. 10 is performed. Next, the identification unit 22 determines the number of drones D used as the monitoring means and selects the drones D used as the monitoring means (step S606). The determination and selection may be performed by using, for example, the above-described method or the like. Thereafter, steps S607 to S609 similar to the steps S506 to S508 in FIG. 10 are performed.

When the monitoring means determined in the step S603 is a camera 30, step S610 similar to the step S509 in FIG. 10 is performed.

When the monitoring means determined in the step S603 is a security guard, step S611 similar to the step S510 in FIG. 10 is performed.

In the step S606, when after the drone D used as the monitoring means is selected, the selected drone D becomes unmonitorable due to a failure or the like, monitoring cannot be performed with the drones D of the number determined above. Therefore, the identification unit 22 may monitor whether the selected drone D has become unmonitorable, and when there is a drone D that has become unmonitorable, may select an alternative drone D. This selection may be performed by using, for example, the above-described method or the like. The identification unit 22 may determine whether the drone D has become unmonitorable, for example, by periodically performing communication with the drone D, and determine that the drone D has become unmonitorable when the communication has become impossible.

As described above, according to the fourth example embodiment, when the drone D is determined as the monitoring means, the identification unit 22 determines the number of the drones D used as the monitoring means and selects the drones D used as the monitoring means. Therefore, since it is possible to monitor the occurrence location of the predetermined event with the optimum number of drones D and the optimum drones D, it is possible to perform monitoring more quickly and with higher accuracy.

Other Example Embodiment

Figure 12:
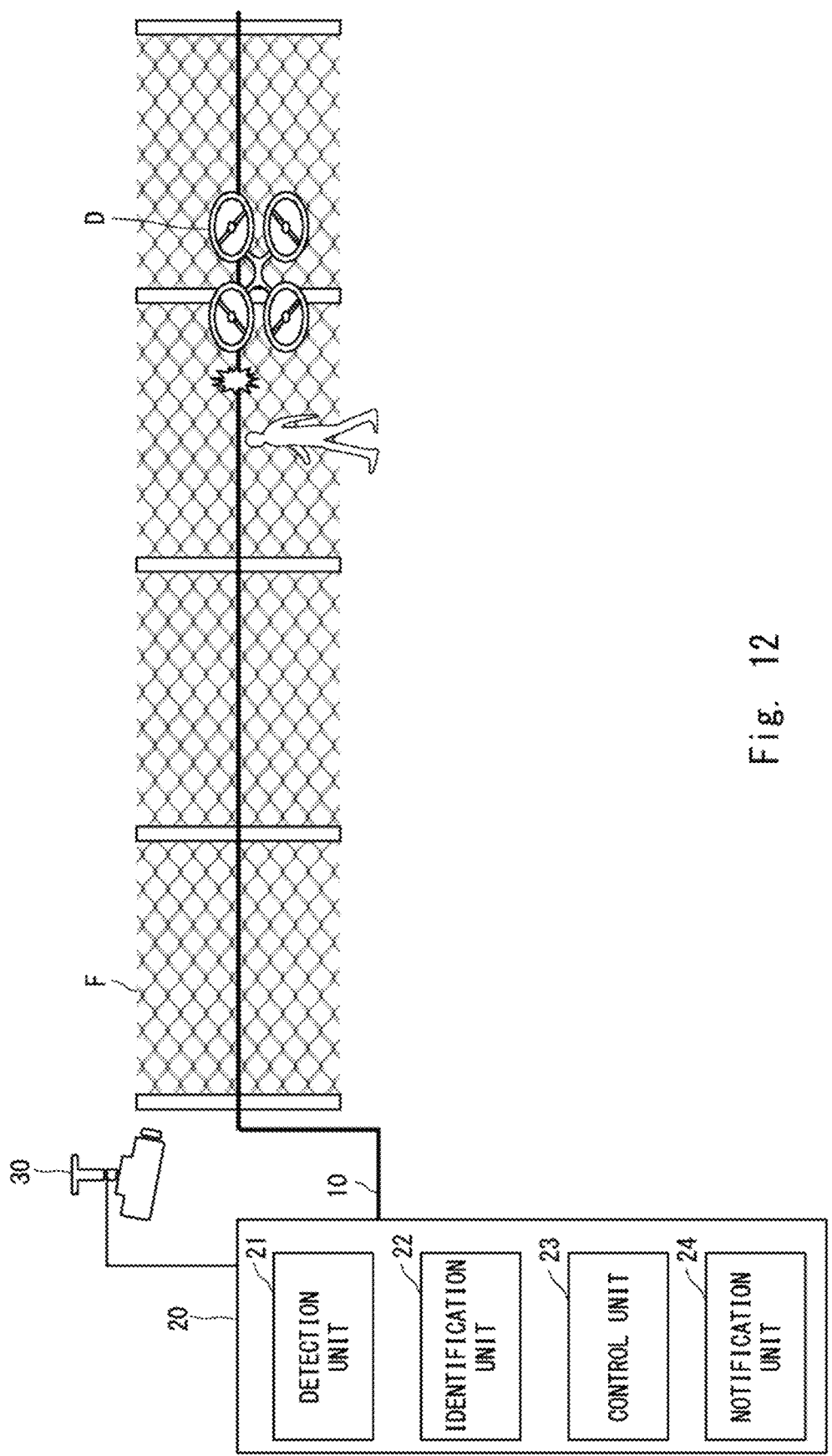
FIG. 12 is a diagram illustrating a configuration example of an optical fiber sensing system according to another example embodiment.
Figure 13:
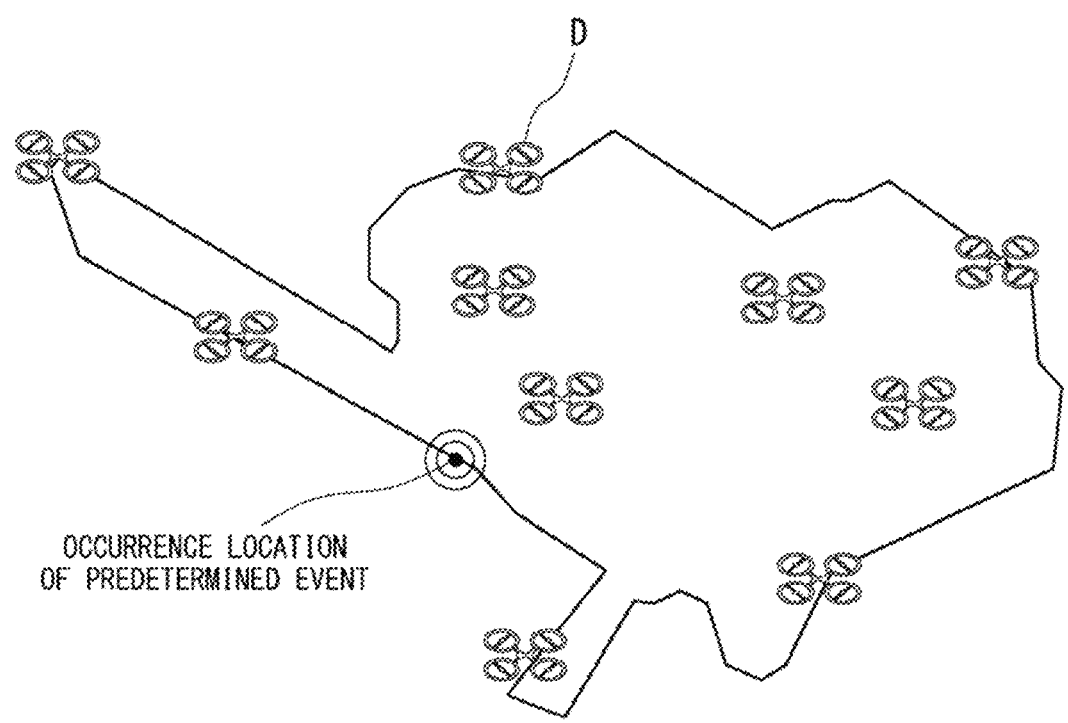
FIG. 13 is a diagram illustrating an example of a GUI screen used for notification by a notification unit according to the another example embodiment.

As illustrated in FIG. 12, an optical fiber sensing equipment 20 may further include a notification unit 24 that notifies that a predetermined event has occurred when the predetermined event has occurred. A notification destination may be, for example, a monitoring terminal in a monitoring system that monitors a monitoring area, a monitoring room that monitors the monitoring area, or the like. A notification method may be, for example, a method of displaying a graphical user interface (GUI) screen on a display, a monitor, or the like being a notification destination, or a method of outputting a message by voice from a speaker being the notification destination. FIG. 13 illustrates an example of a GUI screen notifying that a predetermined event has occurred. In the example of FIG. 13, an occurrence location of the predetermined event and a position of a drone D are superimposed on a map. However, the GUI screen of FIG. 13 is only an example, and is not limited to this. For example, the GUI screen may indicate whether the drone D superimposed on the map is being monitoring or standing by, or may add a photographed image photographed by the drone D being monitoring.

The notification unit 24 may notify a terminal carried by a security guard that a predetermined event has occurred. The notification method may be a method of displaying the GUI screen described above, or a method of outputting a message by voice. The GUI screen at this time may be the same as the GUI screen of FIG. 13 described above.

In the examples of FIGS. 1, 3, 4, 7, and 12, a plurality of the components (detection unit 21, identification unit 22, control unit 23, and notification unit 24) are provided in the optical fiber sensing equipment 20, but the present invention is not limited thereto. The components provided in the optical fiber sensing equipment 20 are not limited to being provided in one device, and may be provided in a distributed manner in a plurality of devices.

<Hardware Configuration of Optical Fiber Sensing Equipment>

Next, a hardware configuration of a computer 40 that achieves optical fiber sensing equipment 20 will be described below with reference to FIG. 14.

Figure 14:
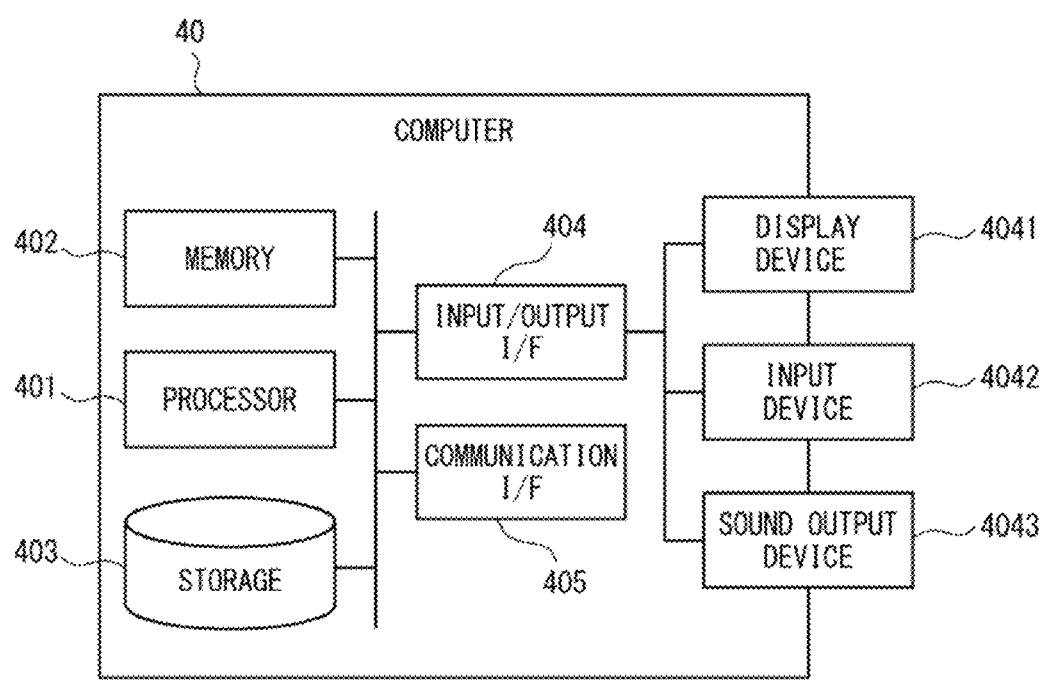
FIG. 14 is a block diagram illustrating an example of a hardware configuration of a computer for achieving optical fiber sensing equipment.

As illustrated in FIG. 14, the computer 40 includes a processor 401, a memory 402, a storage 403, an input/output interface (input/output I/F) 404, a communication interface (communication I/F) 405, and the like. The processor 401, the memory 402, the storage 403, the input/output interface 404, and the communication interface 405 are connected to each other through a data transmission path for transmitting and receiving data.

The processor 401 is, for example, an arithmetic processing unit such as a central processing unit (CPU) or a graphics processing unit (GPU). The memory 402 is, for example, a memory such as a random access memory (RAM), or a read only memory (ROM). The storage 403 is, for example, a storage device such as a Hard Disk Drive (HDD), a solid state drive (SSD), or a memory card. The storage 403 may be a memory such as a RAM or a ROM.

The storage 403 stores a program for achieving functions of the components (detection unit 21, identification unit 22, control unit 23, and notification unit 24) included in the optical fiber sensing equipment 20. The processor 401 executes these programs, thereby achieving the functions of the components included in the optical fiber sensing equipment 20. Herein, when executing the above-mentioned programs, the processor 401 may execute these programs after reading them onto the memory 402, or may execute them without reading them onto the memory 402. The memory 402 and the storage 403 also serve to store information and data held by the components included in the optical fiber sensing equipment 20.

Also, the programs described above may be stored by using various types of non-transitory computer readable media and provided to a computer (including the computer 40). The non-transitory computer readable media include various types of tangible storage media. Examples of the non-transitory computer readable media include a magnetic recording medium (e.g., a flexible disk, a magnetic tape, and a hard disk drive), a magneto-optical recording medium (e.g., a magneto-optical disk), a compact disc-ROM (CD-ROM), a CD-Recordable (CD-R), a CD-ReWritable (CD-R/W), a semiconductor memory (e.g., a mask ROM, a programmable ROM (PROM), an erasable PROM (EPROM), a flash ROM, and a RAM. The program may also be provided to the computer by various types of transitory computer readable media. Examples of the transitory computer readable media include electrical signals, optical signals, and electromagnetic waves. The transitory computer readable media can provide the program to the computer via a wired communication path such as an electrical wire and an optical fiber, or a wireless communication path.

The input/output interface 404 is connected to a display device 4041, an input device 4042, a sound output device 4043, and the like. The display device 4041 is a device that displays a screen associated to drawing data processed by the processor 401, such as a liquid crystal display (LCD), cathode ray tube (CRT) display, or a monitor. The input device 4042 is a device that accepts an operator's operation input, and examples thereof include a keyboard, a mouse, a touch sensor, and the like. The display device 4041 and the input device 4042 may be integrated and achieved as a touch panel. The sound output device 4043 is a device that acoustically outputs a sound associated to sound data processed by the processor 401, such as a speaker.

The communication interface 405 transmits and receives data to and from an external device. For example, the communication interface 405 communicates with an external device via a wired communication path or a wireless communication path.

Although the present disclosure has been described above with reference to the example embodiments, the present disclosure is not limited to the example embodiments described above. Various modifications may be made to the structure and details of the present disclosure as will be understood by those skilled in the art within the scope of the present disclosure.

For example, some or all of the above-described example embodiments may be used in combination with each other.

In addition, some or all of the above-mentioned example embodiments may be described as the following Supplementary notes, but the present invention is not limited to the following.

(Supplementary Note 1)
An optical fiber sensing system including:
an optical fiber that detects vibration;
a detection unit that detects occurrence of a predetermined event, based on an optical signal on which vibration detected by the optical fiber is superimposed;
an identification unit that identifies an occurrence location of the predetermined event, based on the optical signal, and identifies a movement destination area serving as a movement destination of an unmanned aerial vehicle that monitors an occurrence location of the predetermined event, based on an occurrence location of the predetermined event; and
a control unit that controls the unmanned aerial vehicle to move to the movement destination area.

(Supplementary Note 2)
The optical fiber sensing system according to Supplementary note 1, wherein the detection unit detects occurrence of the predetermined event, based on a vibration pattern of the optical signal.

(Supplementary Note 3)
The optical fiber sensing system according to Supplementary note 1 or 2, wherein the identification unit identifies the movement destination area in such a way as to follow a positional change of an occurrence location of the predetermined event.

(Supplementary Note 4)
The optical fiber sensing system according to any one of Supplementary notes 1 to 3, further including
a camera,
wherein the identification unit
determines a monitoring means for monitoring an occurrence location of the predetermined event from among the unmanned aerial vehicle, the camera, and a person, based on the occurrence location of the predetermined event, and
identifies the movement destination area when the unmanned aerial vehicle is determined as the monitoring means.

(Supplementary Note 5)
The optical fiber sensing system according to Supplementary note 4, wherein the identification unit determines the number of the unmanned aerial vehicles, based on a vibration pattern of the optical signal, when the unmanned aerial vehicle is determined as the monitoring means.

(Supplementary Note 6)
The optical fiber sensing system according to any one of Supplementary notes 1 to 5, wherein the unmanned aerial vehicle is a drone.

(Supplementary Note 7)
Optical fiber sensing equipment including:
a detection unit that detects occurrence of a predetermined event, based on an optical signal on which vibration detected by an optical fiber is superimposed;
an identification unit that identifies an occurrence location of the predetermined event, based on the optical signal, and identifies a movement destination area serving as a movement destination of an unmanned aerial vehicle that monitors an occurrence location of the predetermined event, based on an occurrence location of the predetermined event; and
a control unit that controls the unmanned aerial vehicle to move to the movement destination area.

(Supplementary Note 8)
The optical fiber sensing equipment according to Supplementary note 7, wherein the detection unit detects occurrence of the predetermined event, based on a vibration pattern of the optical signal.

(Supplementary Note 9)
The optical fiber sensing equipment according to Supplementary note 7 or 8, wherein the identification unit identifies the movement destination area in such a way as to follow a positional change of an occurrence location of the predetermined event.

(Supplementary Note 10)
The optical fiber sensing equipment according to any one of Supplementary notes 7 to 9, wherein the identification unit
determines a monitoring means for monitoring an occurrence location of the predetermined event from among the unmanned aerial vehicle, a camera, and a person, based on an occurrence location of the predetermined event, and
identifies the movement destination area when the unmanned aerial vehicle is determined as the monitoring means.

(Supplementary Note 11)

The optical fiber sensing equipment according to Supplementary note 10, wherein the identification unit determines the number of the unmanned aerial vehicles, based on a vibration pattern of the optical signal, when the unmanned aerial vehicle is determined as the monitoring means.

(Supplementary Note 12)

The optical fiber sensing equipment according to any one of Supplementary notes 7 to 11, wherein the unmanned aerial vehicle is a drone.

(Supplementary Note 13)

An unmanned aerial vehicle allocation method using an optical fiber sensing system, the unmanned aerial vehicle allocation method including:
- a first detection step of detecting vibration by an optical fiber;
- a second detection step of detecting occurrence of a predetermined event, based on an optical signal on which vibration detected by the optical fiber is superimposed;
- an identification step of identifying an occurrence location of the predetermined event, based on the optical signal, and identifying a movement destination area serving as a movement destination of an unmanned aerial vehicle that monitors an occurrence location of the predetermined event, based on an occurrence location of the predetermined event; and
- a control step of controlling the unmanned aerial vehicle to move to the movement destination area.

(Supplementary Note 14)

The unmanned aerial vehicle allocation method according to Supplementary note 13, wherein the second detection step includes detecting occurrence of the predetermined event, based on a vibration pattern of the optical signal.

(Supplementary Note 15)

The unmanned aerial vehicle allocation method according to Supplementary note 13 or 14, wherein the identification step includes identifying the movement destination area in such a way as to follow a positional change of an occurrence location of the predetermined event.

(Supplementary Note 16)

The unmanned aerial vehicle allocation method according to any one of Supplementary notes 13 to 15, wherein the identification step includes:
- determining a monitoring means for monitoring an occurrence location of the predetermined event from among the unmanned aerial vehicle, a camera, and a person, based on an occurrence location of the predetermined event; and
- identifying the movement destination area when the unmanned aerial vehicle is determined as the monitoring means.

(Supplementary note 17)

The unmanned aerial vehicle allocation method according to Supplementary note 16, wherein the identification step includes determining the number of the unmanned aerial vehicles, based on a vibration pattern of the optical signal, when the unmanned aerial vehicle is determined as the monitoring means.

(Supplementary Note 18)

The unmanned aerial vehicle allocation method according to any one of Supplementary notes 13 to 17, wherein the unmanned aerial vehicle is a drone.

REFERENCE SIGNS LIST

10 Optical fiber
20 Optical fiber sensing equipment
21 Detection unit
22 Identification unit
23 Control unit
24 Notification unit
30 Camera
40 Computer
401 Processor
402 Memory
403 Storage
404 Input/output interface
4041 Display device
4042 Input device
4043 Sound output device
405 Communication Interface
D Drone
F Fence

What is claimed is:

1. An optical fiber sensing system comprising:
an optical fiber configured to detect vibration;
a detection unit configured to detect an occurrence of a predetermined event using an optical signal on which vibration detected by the optical fiber is superimposed;
an identification unit configured to identify an occurrence location of the predetermined event, using the optical signal, and to identify a movement destination area serving as a movement destination of an unmanned aerial vehicle configured to monitor an occurrence location of the predetermined event using the occurrence location of the predetermined event;
a control unit configured to control the unmanned aerial vehicle to move to the movement destination area; and
a camera,
wherein the identification unit is configured to:
determine a monitor for monitoring the occurrence location of the predetermined event from among the unmanned aerial vehicle, the camera, and a person, using the occurrence location of the predetermined event, and
identify the movement destination area if the unmanned aerial vehicle is determined as the monitor.

2. The optical fiber sensing system according to claim 1, wherein the detection unit is configured to detect the occurrence of the predetermined event using a vibration pattern of the optical signal.

3. The optical fiber sensing system according to claim 1, wherein the identification unit is configured to identify the movement destination area in such a way as to follow a positional change of the occurrence location of the predetermined event.

4. The optical fiber sensing system according to claim 1, wherein the identification unit is configured to determine a number of unmanned aerial vehicles using a vibration pattern of the optical signal, if the unmanned aerial vehicle is determined as the monitor.

5. Optical fiber sensing equipment comprising:
a detection unit configured to detect an occurrence of a predetermined event using an optical signal on which vibration detected by an optical fiber is superimposed;
an identification unit configured to identify an occurrence location of the predetermined event, using the optical signal, and to identify a movement destination area serving as a movement destination of an unmanned aerial vehicle configured to monitor the occurrence location of the predetermined event using the occurrence location of the predetermined event; and
a control unit configured to control the unmanned aerial vehicle to move to the movement destination area, wherein the identification unit is configured to:
  determine a monitor for monitoring the occurrence location of the predetermined event from among the unmanned aerial vehicle, a camera, and a person, using the occurrence location of the predetermined event; and
  identify the movement destination area if the unmanned aerial vehicle is determined as the monitor.

6. The optical fiber sensing equipment according to claim 5, wherein the detection unit is configured to detect the occurrence of the predetermined event using a vibration pattern of the optical signal.

7. The optical fiber sensing equipment according to claim 5, wherein the identification unit is configured to identify the movement destination area in such a way as to follow a positional change of the occurrence location of the predetermined event.

8. The optical fiber sensing equipment according to claim 5, wherein the identification unit is configured to determine a number of unmanned aerial vehicles, using a vibration pattern of the optical signal, if the unmanned aerial vehicle is determined as the monitor.

9. An unmanned aerial vehicle allocation method using an optical fiber sensing system, the unmanned aerial vehicle allocation method comprising:
  a first detection operation comprising detecting vibration by an optical fiber;
  a second detection operation comprising detecting an occurrence of a predetermined event using an optical signal on which vibration detected by the optical fiber is superimposed;
  an identification operation comprising identifying an occurrence location of the predetermined event, using the optical signal, and comprising identifying a movement destination area serving as a movement destination of an unmanned aerial vehicle configured to monitor the occurrence location of the predetermined event using the occurrence location of the predetermined event; and
  a control operation of controlling the unmanned aerial vehicle to move to the movement destination area,
  wherein the identification operation comprises:
    determining a monitor for monitoring the occurrence location of the predetermined event from among the unmanned aerial vehicle, a camera, and a person, using the occurrence location of the predetermined event; and
    identifying the movement destination area if the unmanned aerial vehicle is determined as the monitor.

10. The unmanned aerial vehicle allocation method according to claim 9, wherein the second detection operation comprises detecting the occurrence of the predetermined event using a vibration pattern of the optical signal.

11. The unmanned aerial vehicle allocation method according to claim 9, wherein the identification operation comprises identifying the movement destination area in such a way as to follow a positional change of the occurrence location of the predetermined event.

12. The unmanned aerial vehicle allocation method according to claim 9, wherein the identification operation comprises determining a number of unmanned aerial vehicles using a vibration pattern of the optical signal, if the unmanned aerial vehicle is determined as the monitor.

* * * * *